US011454348B2

(12) United States Patent
Plariza et al.

(10) Patent No.: US 11,454,348 B2
(45) Date of Patent: Sep. 27, 2022

(54) INTERLOCKING DEVICE

(71) Applicant: SICK AG, Waldkirch/Breisgau (DE)

(72) Inventors: Julio Sandino Plariza, Cebu (PH); Omar Saycon, Cebu (PH); Trevor Lee, Singapore (SG)

(73) Assignee: SICK AG, Waldkirch/Breisgau (DE)

( * ) Notice: Subject to any disclaimer, the term of this patent is extended or adjusted under 35 U.S.C. 154(b) by 463 days.

(21) Appl. No.: 16/708,916

(22) Filed: Dec. 10, 2019

(65) Prior Publication Data

US 2020/0182403 A1 Jun. 11, 2020

(30) Foreign Application Priority Data

Dec. 11, 2018 (EP) ..................................... 18211686

(51) Int. Cl.
*F16P 3/08* (2006.01)
*G01S 7/481* (2006.01)
*G05B 9/02* (2006.01)
*E05B 47/00* (2006.01)

(52) U.S. Cl.
CPC ................ *F16P 3/08* (2013.01); *E05B 47/00* (2013.01); *G01S 7/481* (2013.01); *G05B 9/02* (2013.01); *E05B 2047/0086* (2013.01)

(58) Field of Classification Search
CPC .... F16P 3/08; E05B 47/00; E05B 2047/0086; G01S 7/481; G05B 9/02
See application file for complete search history.

(56) References Cited

U.S. PATENT DOCUMENTS 8,814,233 B2    8/2014  Leska et al.
10,892,123 B2 *  1/2021  Pizzato ..................... F16P 3/08

FOREIGN PATENT DOCUMENTS

DE            10252025 A1    5/2004

OTHER PUBLICATIONS

Search Report corresponding to EP Application No. 18211686.3 Cited Jun. 26, 2019.
Communication Pursuant to Article 94(3) EPC dated Feb. 26, 2020 corresponding to European application No. 18211686.3-1009.

* cited by examiner

*Primary Examiner* — Carlos Amaya
(74) *Attorney, Agent, or Firm* — Nath, Goldberg & Meyer; Jerald L. Meyer (57) ABSTRACT

An interlocking device for locking a movable safety guard has a locking unit, an electric mover, an additional release unit, a sensor device and an evaluation unit. The locking unit is movable between a locking position for interlocking the movable safety guard and a release position for releasing the movable safety guard and the mover is configured to move the locking unit between the locking position and the release position. The additional release unit is movable from a neutral position into an additional release position to move the locking unit from the locking position into the release position. The sensor device is configured to detect a position of the locking unit and a position of the additional release unit. The evaluation unit is configured to output a locking signal, a normal release signal, and an additional release signal.

17 Claims, 6 Drawing Sheets

INTERLOCKING DEVICE

The present invention relates to an interlocking device for interlocking a movable safety guard, e.g. a safety door, and to a method for determining a position of a locking unit of an interlocking device for a movable safety guard.

Movable safety guards contribute to safety of machinery, for example in automation technology. They protect people or a running automation processes by blocking access to a safety area of a machine while dangerous machine functions are active. Such dangerous functions may, for example, result in dangerous movement of machine parts or the generation of heat or radiation. Movable safety guards may be configured as safety doors or sliding safety fences, for example.

A control system controlling potentially dangerous machinery is usually configured in a way that dangerous functions can only be enabled when movable safety guards of the machine are closed and interlocked and that the movable safety guards may only be opened again when the dangerous functions have been safely stopped. Therefore, it is guaranteed that the guards cannot be opened while a dangerous machine function is being performed. The locking of the safety guards thus has to be considered as a safety function of the control system. The requirements on such safety functions are specified in several safety standards.

Interlocking devices for safety guards usually comprise a locking element or latch that engages with an actuator (a movable part) of the interlocking device in order to lock and/or guard lock the safety guard. Usually, the part of the interlocking device comprising the latch is mounted stationary on a frame of the safety guard and the actuator is mounted on the movable guard itself.

For moving the locking element, interlocking devices usually comprise an electro-mechanical mover. The mover may operate according to the closed-circuit principle so that the locking element is moved into and remains in the locking position when no energy is supplied to the mover and only releases the locking element when energy is supplied.

In addition to an electro-mechanical mover, interlocking devices usually comprise an additional release mechanism for releasing the locking element manually. This additional release mechanism may perform an auxiliary release function which is activated by a tool, for example by a screwdriver or a key, or it may perform an emergency release function which is actuated fully manually, for example by an emergency push button. The emergency release function may particularly be actuatable from within the safety area closed off by the safety guard.

When the locking element has been released by the additional release mechanism, the interlocking device is usually blocked in the release position and a manual reset of the release mechanism is necessary. Therefore, attempts to activate the locking function after activating the additional release mechanism and before manual reset result in a failure of the interlocking device. Due to the manual activation of the additional release mechanism, the control system of the machinery protected by the interlocking device is not able to discern whether such failure is caused by the interlocking device being blocked due to activation of the additional release mechanism or by a failure of other controls of the interlocking device that are not related to the additional release mechanism. This often necessitates a tedious failure analysis before normal operation of the interlocking device may be resumed.

is an objective of the invention to provide an interlocking device for a movable safety guard and a method for determining a position of a locking unit of such an interlocking device that allow for easy resetting of the interlocking device after an additional release operation.

This objective is solved by an interlocking device and a method for determining a position of a locking unit of an interlocking device according to the independent claims. Embodiments of the invention are given by the dependent claims, the drawings and the description.

An interlocking device for locking a movable safety guard has a locking unit, an electric mover, an additional release unit, a sensor device and an evaluation unit. The locking unit is movable between a locking position for interlocking the movable safety guard and a release position for releasing the movable safety guard and the mover is configured to move the locking unit between the locking position and the release position. The additional release unit is movable from a neutral position into an additional release position to move the locking unit from the locking position into the release position. The sensor device is configured to detect a position of the locking unit and a position of the additional release unit. The evaluation unit is configured to output a locking signal when the locking unit is in the locking position, a normal release signal when the locking unit has been moved into the release positon by the electric mover, and an additional release signal when the locking unit has been moved into the release position by the additional release unit.

By evaluating the additional release signal, it is therefore possible to discern situations in which the locking unit has been moved into the release position by the mover and situations in which the locking unit has been moved into the release position by the additional release unit. It is thus possible to detect via the signal outputted by the evaluation unit, whether or not the auxiliary release mechanism of the interlocking device has been activated. This facilitates troubleshooting.

In particular, the additional release unit may be configured to remain in the additional release position after movement from the neutral position into the additional release position and to only return from the additional release position to the neutral position upon manual reset. Furthermore, the auxiliary release unit may block the locking unit of the interlocking device in the release position while the auxiliary release unit is in the additional release position. The additional release signal then indicates that a manual reset is necessary in order to be able to again lock the interlocking device. In addition, by evaluating the additional release signal it is possible to record how often the additional release unit has been triggered and an additional release function has been performed. This may simplify maintenance or monitoring of the interlocking device.

The sensor device may comprise a main sensor and an auxiliary sensor. The main sensor and the auxiliary sensor form a sensor assembly. The main sensor and the auxiliary sensor may each be configured as individual and separated sensors. They might also be combined in a common sensor unit or even a single sensor. The sensor device may be configured to adopt at least three different states, whereby a first state is taken when the locking unit is in the locking position, a second state is taken when the locking unit has been moved into the release position by the electric mover and a third state is adopted when the locking unit has been moved into the release position by the additional release unit. For example, the second state may be adopted when the locking unit is in the release position and the additional release unit is in the neutral position and the third state may be adopted when the locking unit is in the release position and the additional release unit is in the additional release position.

The evaluation unit may be configured to receive a sensor signal that represents the states of the sensor assembly and to output the locking signal, the normal release signal and the additional release signal depending on the at different states received. The evaluation unit may especially be configured to output the locking signal when the sensor signal indicates the first state, to output the normal release signal when the sensor signal indicates the second state and to output the additional release signal when the sensor signal indicates the third state. The sensor signal can comprise a main sensor signal outputted by the main sensor and an auxiliary sensor signal outputted by the auxiliary sensor.

The main sensor and/or the auxiliary sensor may be configured as binary sensors each being able to take an on-state and an off-state. The sensor signal may then comprise a binary signal from the main sensor and a binary signal from the auxiliary sensor. Such a sensor signal can in total indicate four different states which comprise the three different states that the sensor assembly may take. The sensor signal may particularly indicate the first state of the sensor assembly when the main sensor is in the off-state and the auxiliary sensor is in the on-state, the second state of the sensor assembly when the main sensor is in the on-state and the auxiliary sensor in the off-state and the third state of the sensor assembly when the main sensor in the on-state and the auxiliary sensor is also in the on-state. The on-state may represent an actuation of the respective sensor and the off-state may represent the respective sensor not being actuated.

The main sensor 30 and/or the auxiliary sensor 32 may be configured as normally open sensors or may comprise normally open switches. Normally open sensors or normally open switches output a signal that indicates that the sensor is not being actuated or that the switch is not being closed when the sensor or switch is in its default state. In particular, normally open sensors or normally open switches output the signal that indicates that the sensor is not being actuated or that the switch is not being closed when the sensor or switch receives no energy or is defect. The main sensor 30 and/or the auxiliary sensor 32 may particularly be in the off-state when being in the default state or when receiving no energy or being defect.

The main sensor and/or the auxiliary sensor may also be part of any other sensor device which is able to indicate at least three different states. In particular, the main sensor and the auxiliary sensor may be combined in a single, tri-state sensor. The main sensor and/or the auxiliary sensor may be configured as mechanical sensors, for example switches, or as contact-free sensors, for example as light-barriers, Hall sensors, capacitive sensors or the like.

The interlocking device may be part of an interlocking system. The interlocking system may comprise a stationary part attached to a stationary part of a processing machine, for example to a stationary frame of the movable safety guard, and a movable part, which is, for example, attached to the safety guard itself. The stationary part may comprise the interlocking device and the movable part may comprise an actuator of the interlocking device, or vice versa. The locking unit of the interlocking device may comprise a locking element that engages with the actuator in order to fix the position of the actuator with respect to the interlocking device and thereby lock the movable safety guard. The locking element may be configured as a movable latch, particularly as a locking pin, a locking disc or the like.

The movable safety guard may be configured as a sliding or pivoting door, a flap, a cover, a hood or the like. Generally, the safety guard is configured to block access to a safety area of a machine, especially of a processing machine. The interlocking device may be particularly configured to guard lock the safety guard in the closed position, so that it is impossible to open the guard during potentially dangerous operation of the machine.

The mover may be configured to move the locking unit between the locking position and the release position automatically and based on a locking command sent to the interlocking device, for example from a control unit of the processing machine that controls the actuation of the electric mover by transmitting commands to the mover. The signals outputted by the evaluation unit, in particular the additional release signal, may be received and processed by the control unit. The control unit may be configured to only transmit locking commands for causing the mover to move the locking unit into the locking position when the evaluation unit of the interlocking device outputs the normal release signal but not when the evaluation device outputs the additional release signal.

The interlocking device may be configured as an electro-mechanical locking device and the electric mover may be configured to position the locking unit in the release position and/or in the locking position when it is supplied with an electric signal, especially with an electric drive current. The electric mover may be operable according to the closed-circuit principle, so that the mover moves the locking unit into the locking position and keeps the locking unit in the locking position if no electric signal is supplied and only moves the locking unit into the release position upon supply of the electric signal. The mover or the interlocking device may comprise a biasing element, especially a mechanical biasing element, for example a spring, that biases the locking unit towards the locking position when no electric signal is applied.

According to an embodiment of the invention, the sensor device is configured to be actuated by the locking unit and in dependence of the position of the locking unit. In particular, the main sensor of the sensor device may be configured to be actuated by the locking unit and in dependence of the position of the locking unit. The locking unit may comprise a sensor activator configured for indicating the position of the locking unit to the sensor device. The sensor activator may be attached to the locking unit or may be formed by a part of the locking unit, so that it moves together with the locking unit when the locking unit changes position. The sensor activator may, for example, be configured as a part of the locking unit tripping a mechanical switch of the sensor device or the main sensor, or as a part of the locking unit interrupting a light-barrier of the sensor device or the main sensor, or as a magnetic part of the locking unit interacting with a Hall sensor of the sensor device or the main sensor. In particular, the sensor device or the main sensor may be configured to be actuated by the locking unit when the locking unit is moved into the release position.

According to an embodiment of the invention, the sensor device is configured to be actuated by the additional release unit and in dependence of the position of the additional release unit. In particular, the additional sensor of the sensor device may be configured to be actuated by the additional release unit and in dependence of the position of the additional release unit. Like the locking unit, also the auxiliary release unit might comprise a sensor activator configured for indicating the position of the auxiliary release unit to the sensor device or the auxiliary sensor. The sensor activator of the auxiliary release unit may be configured analogously to the configuration of the sensor activator of the locking unit described herein. The sensor device or the auxiliary sensor might be configured to be actuated by the additional release unit only when the additional release unit is moved into or is in the additional release position.

According to an embodiment of the invention, the sensor device comprises the auxiliary sensor and the auxiliary sensor is configured to be actuated by the locking unit and by the additional release unit. In this way, the auxiliary sensor might capture the position of the locking unit in redundancy to the main sensor. The locking unit may comprise a further sensor activator configured for indicating the position of the locking unit to the auxiliary sensor. The further sensor activator might be configured analogously to the sensor activator and the auxiliary sensor activator described herein. The auxiliary sensor might be configured to be actuated by the locking unit only when the locking unit is moved into or is in the locking position. According to an embodiment of the invention, the additional release unit comprises the auxiliary sensor actuator configured to actuate the auxiliary sensor and the locking unit comprises the further sensor actuator configured to actuate the auxiliary sensor.

According to an embodiment of the invention, the further sensor actuator and the auxiliary sensor actuator are positioned about each other along a line of movement of the locking unit. This provides a simple construction of the interlocking device that allows both the further sensor actuator and the auxiliary sensor actuator to actuate the auxiliary sensor.

Along the line of movement, a locking direction is the direction along which the locking unit is moving when changing from the release position into the locking position. In the locking direction, the auxiliary sensor actuator may be positioned after the further sensor actuator or in front of the further sensor actuator. The additional release unit might be configured to move against the locking direction, i.e. in a releasing direction, when the additional release unit is moving the locking unit from the locking position into the release position, thus performing an additional release operation. If the further sensor actuator and the auxiliary sensor actuator are positioned about each other along the line of movement, the auxiliary sensor actuator may move into the position of the further sensor actuator, or vice versa, when moving the additional release unit from the neutral position into the additional release position and simultaneously moving the locking unit from the locking position into the release position.

According to an embodiment of the invention, the evaluation unit is configured to determine whether the auxiliary sensor has been actuated by the additional release unit or by the locking unit by evaluating an actuation of a main sensor of the sensor device. In particular, actuation of the main sensor may be evaluated by evaluating the main sensor signal. The locking unit may be configured to alternately actuate the main sensor and the auxiliary sensor when being positioned in the locking position or in the release position. A simultaneous actuation of the main sensor and the auxiliary sensor then indicates that the auxiliary sensor is actuated by the auxiliary release unit.

According to an embodiment of the invention, the additional release unit is configured to engage with the locking unit, particularly to engage with a coupling element positioned between the mover and a locking element of the locking unit, to move the locking unit from the locking position into the release position. In particular, the additional release unit and the locking unit may move simultaneously and in parallel when the auxiliary release unit moves the locking unit from the locking position into the release position.

According to an embodiment of the invention, the additional release unit has a mechanical stop on which the locking unit abuts in the locking position. In particular, the mechanical stop may engage with the locking unit when the additional release unit moves the locking unit from the locking position into the release position. The mechanical stop thus may serve at least two purposes, so that the construction of the interlocking device is particularly simple.

According to an embodiment of the invention, the additional release unit comprises an auxiliary coupler and the auxiliary coupler comprises a guiding section. The guiding section encloses a coupling element of the locking unit at least on three sides, thus guiding the coupling element when being moved from the locking position into the release position by the mover. This results in a particular simple construction of the interlocking device. The coupling element of the locking unit may be positioned between the electric mover and a locking element, especially a latch, of the locking unit.

According to an embodiment of the invention, the locking unit is independently movable with respect to the additional release unit when the additional release unit is in the neutral position. In particular, the locking unit may be movable into the release position without moving the auxiliary release unit and without changing the state of the sensor device or the auxiliary sensor, especially without actuating the auxiliary sensor.

According to an embodiment of the invention, the interlocking device comprises a mechanical biasing element that keeps the additional release unit in the neutral position when the mover moves the locking unit from the locking position into the release position. This prevents the sensor device from being actuated when the locking unit is moved by the electric mover only. The biasing element may be configured as an elastic element, e.g. as a spring, and a tension of the biasing element may increase, e.g. by stretching or compressing, when the additional release unit is moved into the release position. The biasing element may be positioned between the auxiliary coupler and a carrier of the interlocking device. The baising element may abut against the auxiliary coupler and against the carrier.

According to an embodiment of the invention, the additional release unit is mechanically, particularly manually, movable from the neutral position into the additional release position. The additional release unit may be configured to move when performing an additional release function, in particular an auxiliary release function or an emergency release function, of the interlocking device. The interlocking device may comprise at least one additional mover that is configured to move the additional release unit mechanically, particularly manually, from the neutral position into the additional release position. The additional mover may be configured to be actuated by a tool or by hand. The additional mover may comprise a tool receiving section for positioning a tool or a manual push button.

The invention also relates to a method for determining a position of a locking unit of an interlocking device for a movable safety guard, whereby the locking unit is movable by an electric mover of the interlocking device between a locking position for interlocking the movable safety guard and a release position for releasing the movable safety guard and whereby the locking unit is additionally movable from the locking position into the release position by a movable additional release unit. The method comprises:
- reading out a main sensor of the interlocking device which is configured to be actuated in dependence of the position of the locking unit and reading out an auxiliary sensor of the interlocking device which is configured to be actuated in dependence of a position of the additional release unit,
- outputting a locking signal when the locking unit is in the locking position,
- outputting a normal release signal when the locking unit has been moved into the release positon by the electric mover,
- outputting an additional release signal when the locking unit has been moved into the release position by the additional release unit.

The method for determining a position of a locking unit described may be performed by the interlocking device described herein. In particular, the advantages, preferable features and/or embodiments described in connection with the interlocking device also apply to the method for determining the position of the locking unit of the interlocking device.

According to an embodiment of the method, the auxiliary sensor is actuatable by the additional release unit and by the locking unit, and the method comprises
- determining whether the auxiliary sensor is actuated by the additional release unit or by the locking unit in dependence of an actuation of the main sensor.

In particular, it may be determined that the auxiliary sensor is actuated by the additional release unit when both the main sensor and the auxiliary sensor are simultaneously actuated.

In the following, the invention will be explained in detail by means of exemplary embodiments and with references to figures showing schematically
FIG. 1 a perspective view of an interlocking device for a safety guard.

Figure 1:
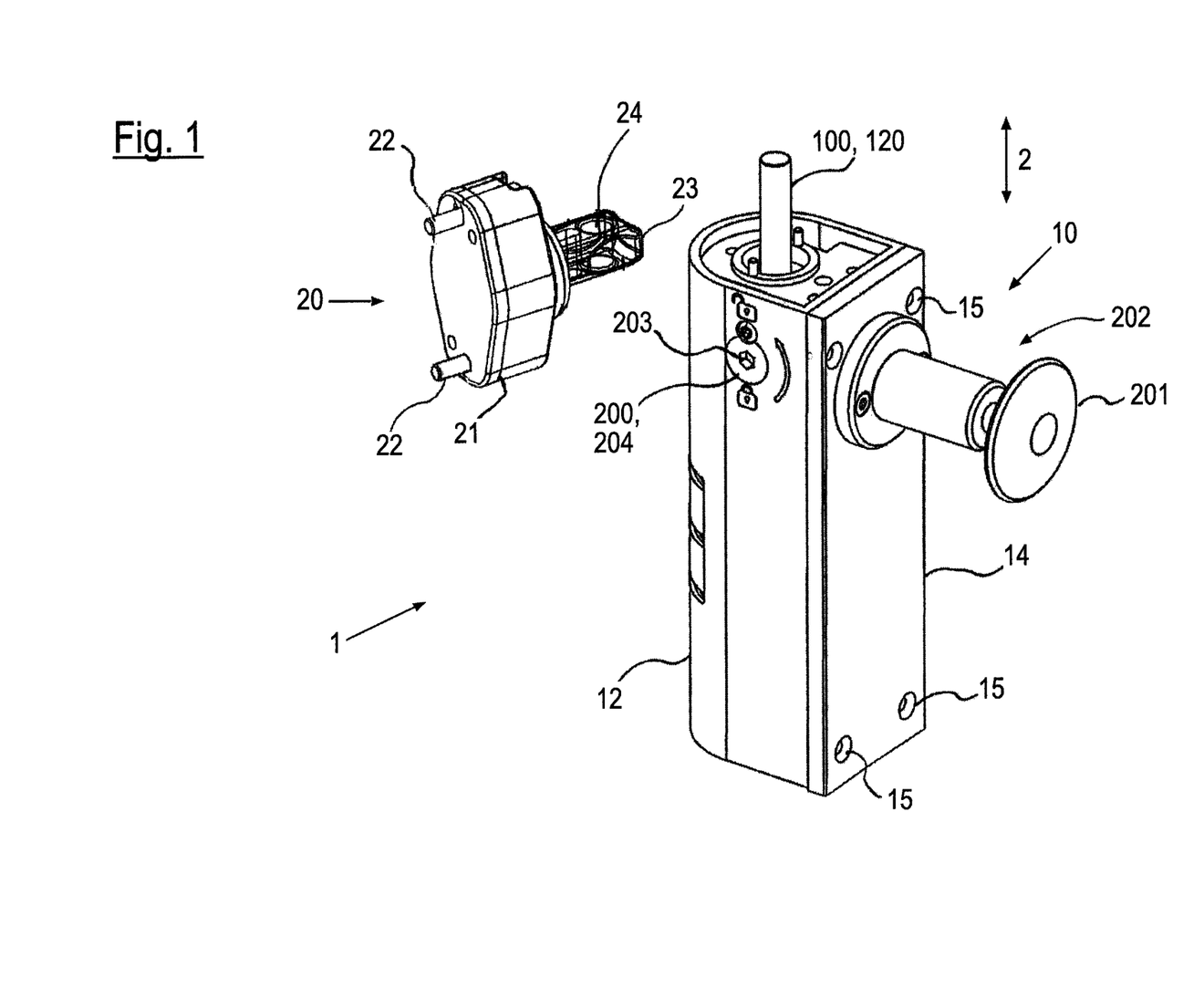

FIG. 1 shows a perspective view of an interlocking system 1 for a safety guard (not shown). The interlocking system 1 comprises an interlocking device 10 forming a stationary part of the interlocking system 1 and being attachable to a stationary part of a machine comprising the safety guard. The interlocking system 1 further comprises a movable part 20 attachable to the safety guard itself. The movable part 20 comprises a holding element 21. The holding element 21 may be fastened to the safety guard by two fastening elements 22, which may be configured as screws, for example. The movable part 20 comprises an actuator 23, configured as a tongue, which is attached to the holding element 21 and comprises an opening 24.

The interlocking device 10 comprises a locking unit 100 with a locking element 120 (i.e. a latch). The locking unit 100 is surrounded by a housing 12 of the interlocking device 10 with the locking element 120 extending through an opening of the housing 12. The locking element 120 is linearly movable back and forth through the opening of the housing 12 along a line of movement. Along a line or direction of movement 2, a closing direction is orientated from inside the housing 12 towards the outside of the housing 12 and a release direction is orientated from outside the housing 12 towards the inside of the housing 12. The locking element 120 has a generally cylindrical shape with an axis of the cylinder orientated along the line of movement 2. In particular, the locking element 120 is configured as a locking pin.

When the guard is closed, the opening 24 of the actuator 23 of the movable element 20 is positioned, especially centered, around the axis of the locking element 120 and the locking element 120 may be inserted into the opening 24 or removed from the opening 24 by moving it along the line of movement 2. In particular, the locking element 120 may be inserted into the opening 24 by moving the locking element 120 out of the housing 12 and the locking element 120 may be removed from the opening 24 by retracting the locking element 120 into the housing 12. When the locking element 120 is positioned inside the opening 24, the position of the movable part 20 is laterally fixed with respect to the interlocking device 10 and the guard is locked. When the locking element 120 is retracted into the housing 12 and not positioned inside the opening 24, the guard is released and may be moved laterally with respect to the stationary part 10.

The locking unit 100 may comprise a termination element (not shown) that is positioned above the opening in the housing 21 so that a gap is formed between the housing 21 and the termination element. When the guard is closed, the actuator 23 may move into the gap. The termination element may be configured to inhibit a movement of the actuator 23 along the axis of the locking element 120 thus preventing the actuator 23 being axially removed axially from the locking element 120. When being in the locking position, the locking element may engage with the termination element.

The interlocking device 10 further comprises a mounting plate 14 which is part of the housing 12. The stationary part 10 can be fastened to a frame of the safety guard. The housing 12 and the locking unit 100 are placed on one side of the mounting plate 14. On an opposing second side of the mounting plate 14, an emergency release element 202 of an additional release unit 200 of the interlocking device 10 is attached to the interlocking device 10. The emergency release element 202 is manually actuatable and comprises a push button 201, in particular as an emergency push button. When the interlocking device 10 is mounted to the frame of the safety guard, the emergency release element 202 extends into a safety area closed off by the safety guard and thus is accessible from inside the safety area.

The interlocking device 10 comprises a further release element 204, which may be actuated manually by using a tool, particularly by using a screwdriver. To this end, the further release element 204 comprises a tool receiving section 203 in which the tool may be applied. The further release element 204 is only accessible from outside the safety area.

Figure 2:
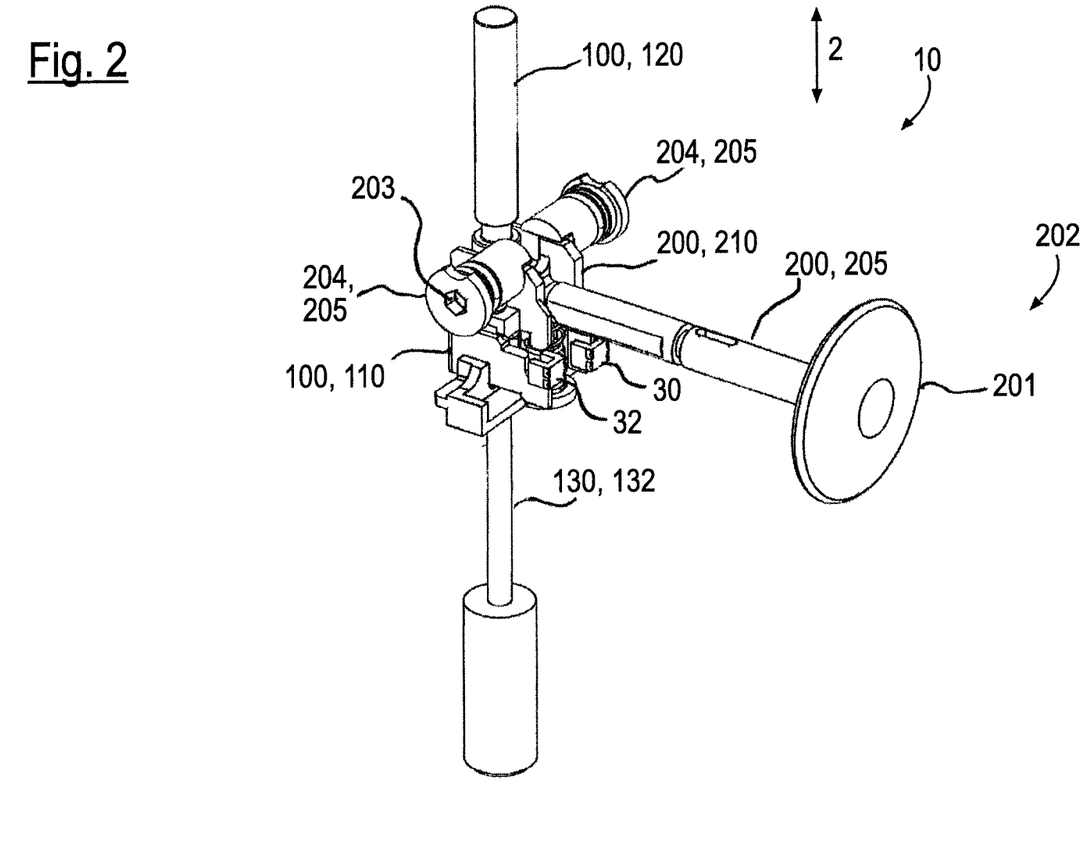
FIG. 2 a perspective view of a locking mechanism of the interlocking device.

FIG. 2 shows a perspective view of a locking mechanism of the interlocking device 10. The locking mechanism comprises an electric mover 130 configured to move the locking element 120 along the line of movement 2. The electric mover 130 is configured as a solenoid comprising a slug 132 surrounded by an electromagnetic coil (not shown). The electric mover 130 could also be configured as an electric motor or a threaded piston. Along the line of movement 2, the slug 132 is rigidly or fixedly connected via a coupling element 110 to the locking element 120. The slug 132 and the coupling element 110 are configured to synchronously move with the locking element 120 along the line of movement 2.

The emergency release element 202, as well as the further release element 204 act upon an auxiliary coupler 210 of the additional release unit 200. When actuating the emergency release element 202 or the further release element 204, the emergency release element 202 or the further release element 204 cause the auxiliary coupler 210 to move in a release direction orientated towards the electric mover 130. The emergency release element 202 and the further release element 204 of the additional release unit 200 each form an additional mover of the additional release unit 200.

The emergency release element 202 comprises a shaft 205 that couples the push button 201 of the emergency release element 202 to the auxiliary coupler 210. The shaft 205 is movable perpendicularly to the line of movement 2. On a first end of the shaft 205, the push button 201 of the emergency release element 202 is located. On its second end, the shaft 205 has a skewed end surface 206 (see also FIG. 3). When moving towards the auxiliary coupler 210 in the direction perpendicular to the line of movement 2 of the locking element 120, the end surface of the shaft 205 slides over a slide face 211 (FIG. 3) of the auxiliary coupler 210 and pushes the auxiliary coupler 210 in the release direction. The slide face of the auxiliary coupler 210 is orientated essentially parallel to the skewed end surface 206 of the shaft 205.

The further release element 204 comprises two rotating elements 205, each of which has cylindrical shape. An axis of each rotating element 205 is aligned perpendicular to the line of movement 2. Each rotating element 205 comprises at one end a protruding section having a flat surface that extends over the auxiliary coupler 210 of the additional release unit 200. Upon rotating one of the rotating elements 205, the flat surface of the protruding section engages a corresponding flat surface of the auxiliary coupler 210 and pushes the auxiliary coupler 210 towards the release direction. The auxiliary coupler 210 is generally positioned about the coupling element 110 of the locking unit 100 in the locking direction.

The interlocking device 10 further comprises a sensor device with a main sensor 30 and an auxiliary sensor 32. The main sensor 30 and the auxiliary sensor 32 are each configured as a light-barrier. They comprise an opening, which is configured as a slit. The opening extends along the line of movement 2. The sensors 30, 32 are configured to detect an object inserted into the openings. To this end, the sensors 30, 32 are configured to emit a light beam from one side of the opening towards the other side of the opening. The light beam has an angle with the line of movement 2 and is in particular orientated perpendicular to the line of movement 2. The sensors 30, 32 are further configured to detect an interruption of their light beam by the object inserted into the opening of the respective sensor 30, 32.

Figure 3:
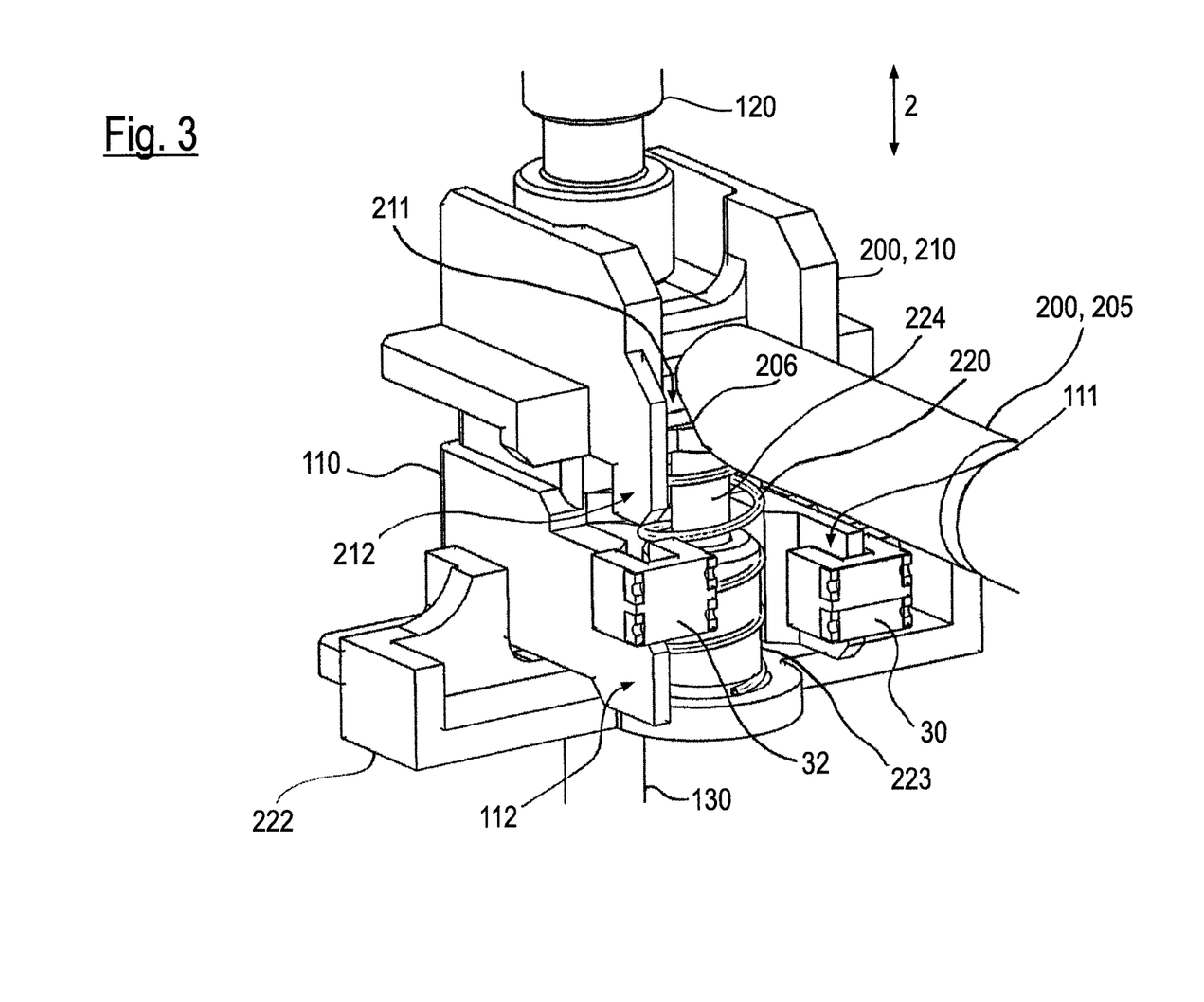
FIG. 3 a perspective close-up view of the locking mechanism in a locking unit of the interlocking device in a release position.

FIG. 3 shows a perspective close-up view of the locking mechanism of the interlocking device 10. In particular, FIG. 3 shows the shaft 205 with the skewed end surface 206 and the slide surface 211 of the auxiliary coupler 210.

The coupling element 110 of the locking unit 100 comprises a sensor actuator 111 and a further sensor actuator 112. The sensor actuators 111, 112 of the locking unit 110 are formed platelike, whereby their extension along the line of movement 2 is larger than perpendicular to the line of movement and in the direction of the light beams of the sensors 30, 32. As the sensor actuator 111 and the further sensor actuator 112 are attached to the coupling element 110, they move together with the coupling element 110 along the line of movement 2. The sensor actuator 111 is configured to actuate the main sensor 30 by moving into the slit of the main sensor 30 and thus blocking the light beam of the main sensor 30 and the further sensor actuator 112 is configured to actuate the auxiliary sensor 32 by moving into the slit of the auxiliary sensor 32 and blocking the light beam of the auxiliary sensor 32.

The auxiliary coupler 210 of the additional release unit 200 comprises an auxiliary sensor actuator 212, which has the same platelike shape as described with respect to the sensor actuators 111, 112 of the coupling element 110 of the locking unit 100. The auxiliary sensor actuator 212 is located about the further sensor actuator 112 and configured to actuate the auxiliary sensor 32 by moving into the slit of the auxiliary sensor 32.

According to alternative embodiments of the interlocking device 10, the sensor actuator 111 and/or the further sensor actuator 112 may be attached to any other movable part of the locking unit 100. In particular, they may be attached to the locking element 120 or to the electric mover 130. Analogously, the auxiliary sensor actuator 212 may be attached to any other movable part of the additional release unit 200. The auxiliary sensor actuator 212 may in particular be attached to the emergency release element 202 and/or the further release element 204.

FIG. 3 shows the locking unit 100 in a release position, in which the locking element 112 is retracted into the housing 12 of the interlocking device 10. In the release position, the sensor actuator 111 actuates the main sensor 30 by blocking its light beam. The further sensor actuator 112 is located outside the slit of the auxiliary sensor 32, so that the auxiliary sensor 32 is not being actuated and its light beam is not being blocked. FIG. 3 further shows the additional release unit 200 in a neutral position, in which the further sensor actuator 112 is located outside the auxiliary sensor 32 and does not actuate the auxiliary sensor 32.

As can be seen from FIG. 3, only the main sensor 30 is actuated, when the locking unit 100 is positioned in the release position and the additional release unit 200 is positioned in the neutral position. Therefore, a main sensor signal of the main sensor 30 represents a logical one, while an auxiliary sensor signal of the auxiliary sensor 32 represents a logical zero.

The interlocking device 10 comprises a biasing element 220, which is configured as a spring. The biasing element 220 is placed between the auxiliary coupler 210 of the additional release unit 200 and a carrier 222 of the interlocking device 10. A position of the carrier 222 is fixed with respect to the mounting plate 14 and the housing 12 of the interlocking device 10. The carrier 222 comprises a guiding element 223, which is configured to guide the auxiliary coupler 210 of the additional release unit 200 along the line of movement 2. The guiding element 223 is placed inside the spring of the biasing element 220, thus also guiding the biasing element 220. The guiding element 223 has essentially cylindrical shape with an axis of the cylinder orientated along the line of movement 2.

The guiding element 223 is configured as a hollow cylinder with a through-hole centered on its axis. The coupling element 110 of the additional release unit 200 has a guiding pin 224 with essentially cylindrical shape. The guiding pin 224 is aligned in parallel to the guiding element 223 of the carrier 222 and extends into the hole of the guiding element 223, thus being guided by the guiding element 223 along the line of movement 2. In alternative embodiments of the interlocking device 10, the guiding element 223 may be configured as a full cylinder and/or the auxiliary coupler 210 of the additional release unit 200 may comprise an opening, through which the guiding element 223 extends along the line of movement 2.

Figure 4:
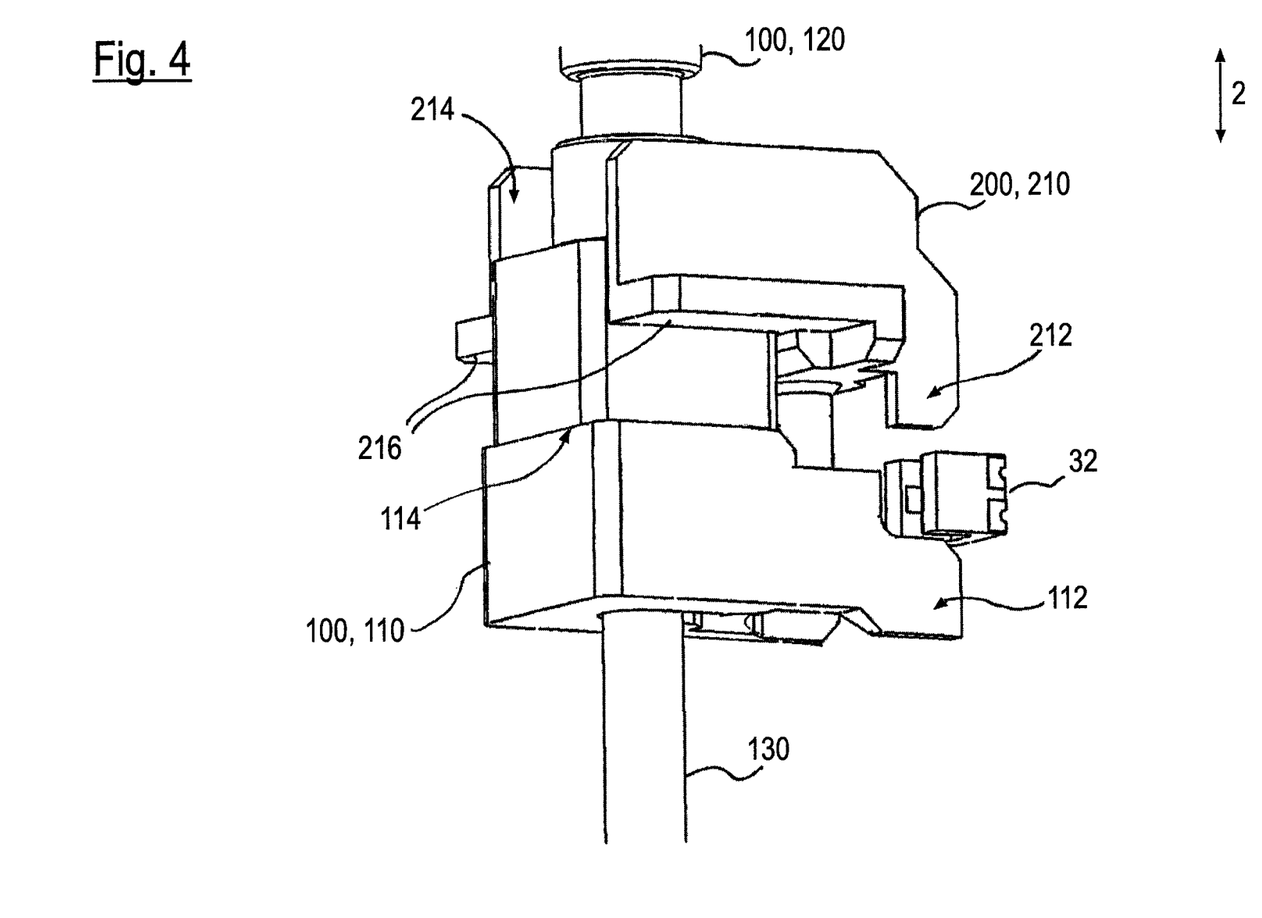
FIG. 4 a further perspective close-up view of the locking mechanism with the locking unit in the release position.

FIG. 4 shows a further perspective close-up view of the locking mechanism of the interlocking device 10 with the locking unit 100 positioned in the release position and the additional release unit 200 positioned in the neutral position. The auxiliary coupler 210 of the additional release unit 200 comprises a guiding section 214. The guiding section 214 comprises three side faces of the auxiliary coupler 210 that are orientated parallel to the line of movement 2. The side faces enclose the coupling element 110 on three sides and thus guide the coupling element 110 along the line of movement 2.

The auxiliary coupler 210 further comprises a mechanical stop 216. The mechanical stop 216 is formed by at least one flat side surface of the auxiliary coupler 210 that faces in the opening direction and extends perpendicular to the line of movement 2. In the locking direction, the mechanical stop 216 is positioned about a corresponding limiting element 114 of the coupling element 110. The limiting element 114 is configured as a protrusion of the coupling element 110 in a transverse direction forming a flat surface that is orientated perpendicular to the line of movement 2. When the coupling element 110 is moved into the locking direction, it abuts with the limiting element 114 on the mechanical stop 216, as soon as the coupling element 110 reaches the locking position. Therefore, the mechanical stop 216 engages with the coupling element 110 when the coupling element 110 is positioned in the locking position.

Figure 5:
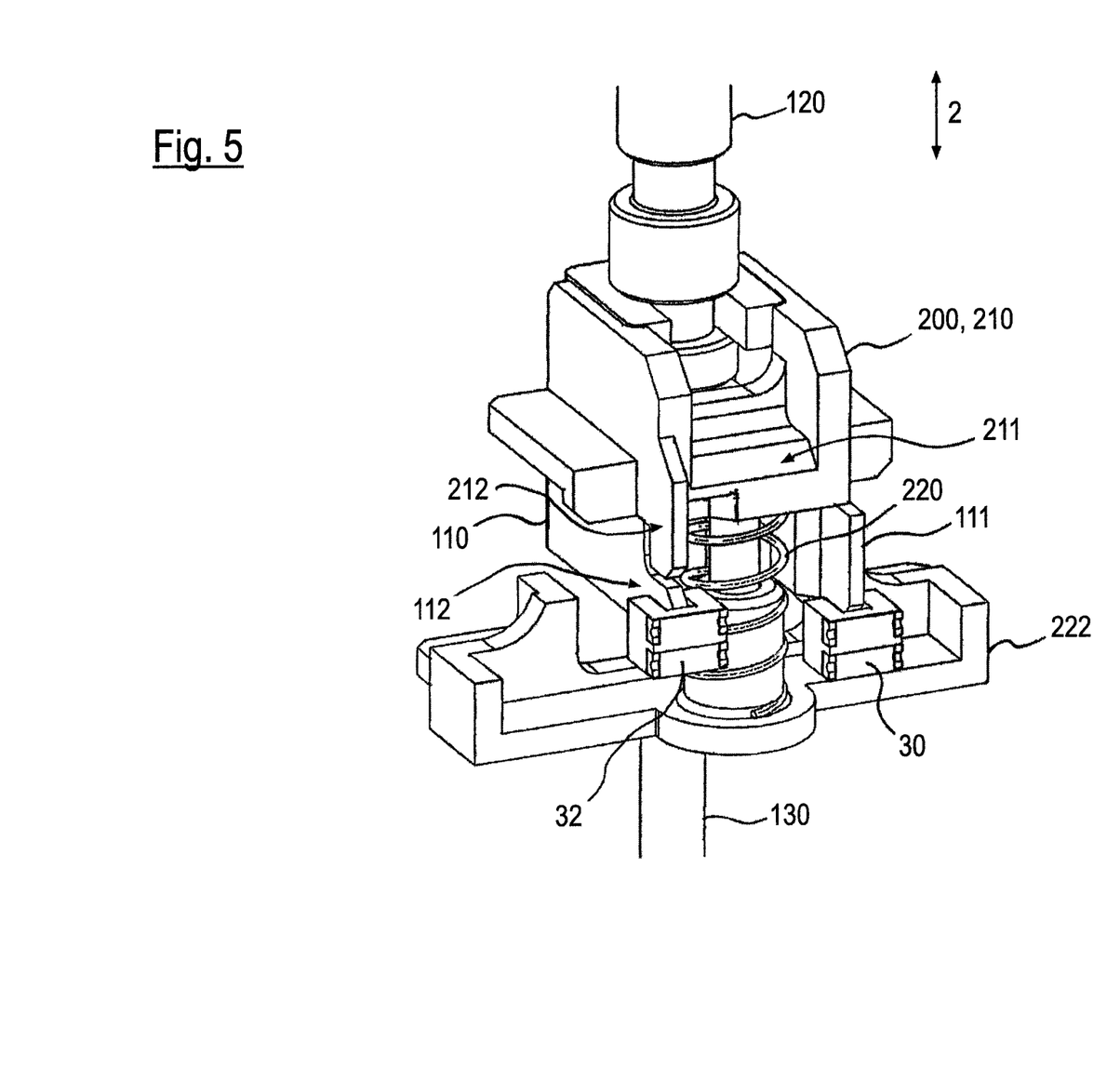
FIG. 5 a perspective close-up view of the locking mechanism with the locking unit in a locking position.

FIG. 5 shows a perspective close-up view of the locking mechanism of the interlocking device 10 with the locking unit 100 positioned in a locking position and the additional release unit 200 positioned in the neutral position. In the locking position, the locking unit 100 has been moved in the locking direction towards the outside of the housing 12 of the interlocking device 10.

In the locking position, the sensor actuator 111 is placed outside the slit of the main sensor 30 and the further sensor actuator 112 is located inside the slit of the auxiliary sensor 32, so that the auxiliary sensor 32, but not the main sensor 30 is being actuated by the locking unit 100. The main sensor signal then represents a logical zero and the auxiliary sensor signal represents a logical one.

When the locking unit 100 is placed in the locking position and the additional release unit 200 is moved from the neutral position in the opening direction, the additional release unit 200 engages with the locking unit 100 via the mechanical stop 216. Therefore, the additional release unit 200 pushes the locking unit 100 in the release direction and towards the release position of the locking unit 100. When the locking unit 100 reaches the release position, the additional release unit 200 simultaneously reaches an additional release position.

Figure 6:
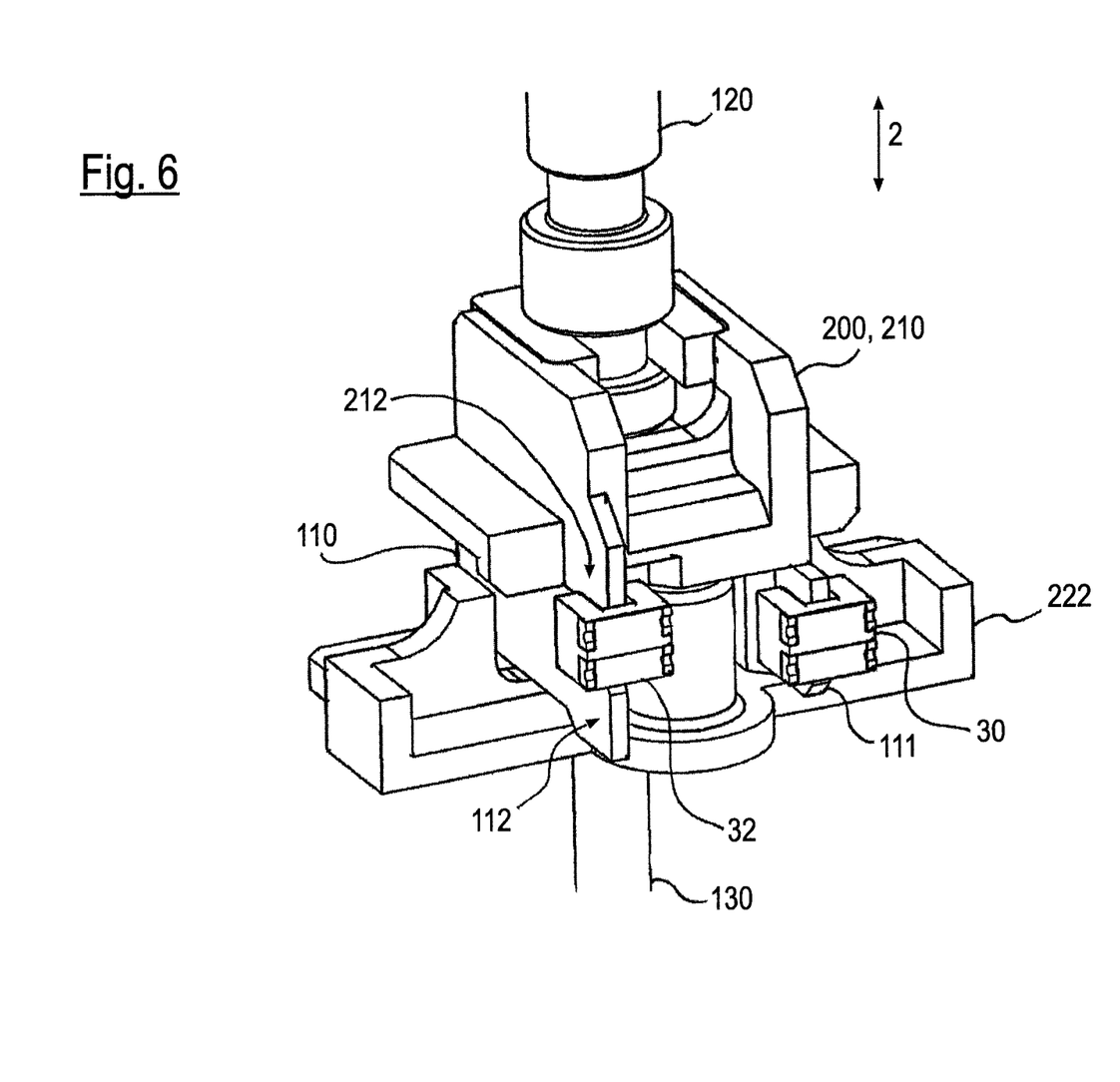
FIG. 6 a perspective close-up view of the locking mechanism with the locking unit in the release position and an additional release unit in a release position.

FIG. 6 shows a perspective close-up view of the locking mechanism of the interlocking device 10 with the locking unit 100 positioned in the release position and the additional release unit 200 positioned in the additional release position. The sensor actuator 111 of the locking element 110 actuates the main sensor 30 and the auxiliary sensor actuator 212 of the additional release unit 200 actuates the auxiliary sensor 32. The main sensor signal, as well as the auxiliary sensor signal then represents a logical one.

An evaluation unit of the interlocking device 10 is connected to the main sensor 30 and the auxiliary sensor 32 and receives the main sensor signal and the auxiliary sensor signal. The evaluation unit is connected to a control unit of the machine secured by the interlocking system 1 and transmits a status signal representing a state of the interlocking device 10 to the control unit. If the main sensor signal represents a logical one and the auxiliary sensor signal represents a logical zero, the evaluation unit outputs a normal release signal as the status signal. If the main sensor signal represents a logical zero and the auxiliary sensor signal represents a logical one, the evaluation unit outputs a locking signal as the status signal. If both the main sensor signal and the auxiliary sensor signal represent a logical one, the evaluation unit outputs an additional release signal as the status signal. The evaluation unit may be a logic module, for example a microcontroller, microprocessor or FPGA.

LIST OF REFERENCE SIGNS

1 interlocking system
2 line of movement
10 interlocking device
12 housing
14 mounting plate
15 mounting elements
20 movable part
21 holding element
22 fastening elements
23 actuator
24 opening
30 main sensor
32 auxiliary sensor
100 locking unit
110 coupling element
111 sensor activator
112 further sensor activator
114 limiting element
120 locking element
130 electric mover
132 slug
200 additional release unit
201 push button
202 emergency release element
203 tool receiving section
204 further release element
205 shaft
206 end surface
210 auxiliary coupler
211 slide surface
212 auxiliary sensor activator
214 guiding section
216 mechanical stop
220 biasing element
222 carrier
223 guiding element

The invention claimed is:

1. An interlocking device for locking a movable safety guard,
having a locking unit, an electric mover, an additional release unit, a sensor device and an evaluation unit,
the locking unit being movable between a locking position for interlocking the movable safety guard and a release position for releasing the movable safety guard,
the mover being configured to move the locking unit between the locking position and the release position, the additional release unit being movable from a neutral position into an additional release position to move the locking unit from the locking position into the release position, the sensor device being configured to detect a position of the locking unit and a position of the additional release unit, the evaluation unit being configured to output a locking signal when the locking unit is in the locking position, a normal release signal when the locking unit has been moved into the release positon by the electric mover, an additional release signal when the locking unit has been moved into the release position by the additional release unit.

2. The interlocking device according to claim 1, the sensor device being configured to be actuated by the locking unit in dependence of the position of the locking unit.

3. The interlocking device of claim 1, the sensor device being configured to be actuated by the additional release unit in dependence of the position of the additional release unit.

4. The interlocking device of claim 3, the sensor device comprising an auxiliary sensor being configured to be actuated by the locking unit and by the additional release unit.

5. The interlocking device of claim 4, the additional release unit comprising an auxiliary sensor actuator configured to actuate the auxiliary sensor, the locking unit comprising a further sensor actuator configured to actuate the auxiliary sensor.

6. The interlocking device of claim 5, the further sensor actuator and the auxiliary sensor actuator being positioned about each other along a line of movement of the locking unit.

7. The interlocking device of claim 4, the evaluation unit being configured to determine whether the auxiliary sensor has been actuated by the additional release unit or by the locking unit by evaluating an actuation of a main sensor of the sensor device.

8. The interlocking device of claim 1, the additional release unit being configured to engage with the locking unit to move the locking unit from the locking position into the release position.

9. The interlocking device of claim 8, the additional release unit being configured to engage with a coupling element positioned between the mover and a locking element of the locking unit.

10. The interlocking device of claim 1, the additional release unit having a mechanical stop on which the locking unit abuts in the locking position.

11. The interlocking device of claim 1, the additional release unit comprising an auxiliary coupler, the auxiliary coupler comprising a guiding section, the guiding section enclosing a coupling element of the locking unit at least on three sides, thus guiding the coupling element when being moved from the locking position to the release position by the mover.

12. The interlocking device of claim 1, the locking unit being independently movable with respect to the additional release unit when the additional release unit is in the neutral position.

13. The interlocking device of claim 1, comprising a mechanical biasing element that keeps the additional release unit in the neutral position when the mover moves the locking unit from the locking position into the release position.

14. The interlocking device of claim 1, the additional release unit being mechanically movable from the neutral position into the additional release position.

15. The interlocking device of claim 14, the additional release unit being manually movable from the neutral position into the additional release position.

16. Method for determining a position of a locking unit of an interlocking device for a movable safety guard, the locking unit being movable by an electric mover of the interlocking device between a locking position for interlocking the movable safety guard and a release position for releasing the movable safety guard, the locking unit being additionally movable from the locking position into the release position by a movable additional release unit, wherein the method comprises:

reading out a main sensor of the interlocking device which is configured to be actuated in dependence of the position of the locking unit and reading out an auxiliary sensor of the interlocking device which is configured to be actuated in dependence of a position of the additional release unit, outputting a locking signal when the locking unit is in the locking position, outputting a normal release signal when the locking unit has been moved into the release positon by the electric mover, outputting an additional release signal when the locking unit has been moved into the release position by the additional release unit.

17. Method of claim 16, the auxiliary sensor being actuatable by the additional release unit and by the locking unit, wherein the method comprises determining whether the auxiliary sensor is actuated by the additional release unit or by the locking unit in dependence of an actuation of the main sensor.

* * * * *